(12) United States Patent
Koren et al.

(10) Patent No.: US 8,699,491 B2
(45) Date of Patent: Apr. 15, 2014

(54) NETWORK ELEMENT WITH SHARED BUFFERS

(75) Inventors: Benny Koren, Zichron Yaakov (IL); Oded Wertheim, Zichron Yaakov (IL); Ido Bukspan, Herzliya (IL); Noam Katz, Tel Aviv (IL); George Elias, Tel Aviv (IL); Itamar Rabenstein, Petah Tikva (IL)

(73) Assignee: Mellanox Technologies Ltd., Yokneam (IL)

( * ) Notice: Subject to any disclaimer, the term of this patent is extended or adjusted under 35 U.S.C. 154(b) by 287 days.

(21) Appl. No.: 13/189,593

(22) Filed: Jul. 25, 2011

(65) Prior Publication Data

US 2013/0028256 A1 Jan. 31, 2013

(51) Int. Cl.
*H04Q 3/68* (2006.01)

(52) U.S. Cl.
USPC ........... 370/392; 370/232; 370/387; 370/388; 709/232

(58) Field of Classification Search
USPC ......... 370/230–232, 236, 237, 229, 387–388, 370/392; 709/232
See application file for complete search history.

(56) References Cited

U.S. PATENT DOCUMENTS

| 5,367,520 | A | 11/1994 | Cordell |
| 5,574,885 | A | 11/1996 | Denzel et al. |
| 6,160,814 | A | 12/2000 | Ren et al. |
| 6,456,590 | B1 | 9/2002 | Ren et al. |
| 6,490,248 | B1 * | 12/2002 | Shimojo ........................ 370/229 |
| 6,535,963 | B1 | 3/2003 | Rivers |
| 6,539,024 | B1 * | 3/2003 | Janoska et al. ................. 370/412 |
| 6,606,666 | B1 * | 8/2003 | Bell, Jr. et al. ................ 709/232 |
| 6,895,015 | B1 | 5/2005 | Chiang et al. |
| 6,922,408 | B2 | 7/2005 | Bloch et al. |
| 7,088,713 | B2 | 8/2006 | Battle et al. |
| 7,136,381 | B2 | 11/2006 | Battle et al. |
| 7,327,749 | B1 | 2/2008 | Mott |
| 7,609,636 | B1 | 10/2009 | Mott |
| 7,773,622 | B2 * | 8/2010 | Schmidt et al. ................ 370/414 |

(Continued)

FOREIGN PATENT DOCUMENTS

| EP | 1698976 A1 | 9/2006 |
| WO | 03024033 A1 | 3/2003 |

OTHER PUBLICATIONS

Raatikainen, P., "ATM Switches—Switching Technology S38.3165", Switching Technology, L8-1, 2006 (http://www.netlab.hut.fi/opetus/s383165).

(Continued)

*Primary Examiner* — Charles C Jiang
*Assistant Examiner* — Mohamed Kamara
(74) *Attorney, Agent, or Firm* — D. Kligler IP Services Ltd.

(57) ABSTRACT

A method for communication, in a network element that includes multiple ports, includes buffering data packets entering the network element via the ports in input buffers that are respectively associated with the ports. Storage of the data packets is shared among the input buffers by evaluating a condition related to the ports, and, when the condition is met, moving at least one data packet from a first input buffer of a first port to a second input buffer of a second port, different from the first port. Respective output ports, via which the buffered data packets are to exit the network element, are selected from among the ports. The buffered data packets are forwarded to the selected output ports.

20 Claims, 2 Drawing Sheets

(56) References Cited

U.S. PATENT DOCUMENTS

| | | | |
|---|---|---|---|
| 7,853,738 | B2 | 12/2010 | Pothireddy et al. |
| 7,936,770 | B1 | 5/2011 | Frattura et al. |
| 8,149,710 | B2 | 4/2012 | Bergamasco et al. |
| 8,270,295 | B2 | 9/2012 | Kendall et al. |
| 8,274,971 | B2 | 9/2012 | Battle et al. |
| 2002/0012340 | A1 | 1/2002 | Kalkunte et al. |
| 2002/0027908 | A1 | 3/2002 | Kalkunte et al. |
| 2003/0048792 | A1 | 3/2003 | Xu et al. |
| 2003/0076849 | A1 | 4/2003 | Morgan et al. |
| 2003/0095560 | A1 | 5/2003 | Arita et al. |
| 2003/0118016 | A1 | 6/2003 | Kalkunte et al. |
| 2003/0137939 | A1* | 7/2003 | Dunning et al. .............. 370/235 |
| 2003/0198231 | A1 | 10/2003 | Kalkunte et al. |
| 2003/0198241 | A1 | 10/2003 | Putcha et al. |
| 2003/0200330 | A1 | 10/2003 | Oelke et al. |
| 2004/0066785 | A1 | 4/2004 | He et al. |
| 2005/0135356 | A1* | 6/2005 | Muthukrishnan et al. .... 370/389 |
| 2005/0259574 | A1* | 11/2005 | Figueira et al. ............... 370/229 |
| 2006/0155938 | A1 | 7/2006 | Cummings et al. |
| 2006/0182112 | A1 | 8/2006 | Battle et al. |
| 2007/0025242 | A1 | 2/2007 | Tsang |
| 2009/0003212 | A1* | 1/2009 | Kwan et al. ................... 370/235 |
| 2009/0010162 | A1 | 1/2009 | Bergamasco et al. |
| 2009/0161684 | A1 | 6/2009 | Voruganti et al. |
| 2010/0100670 | A1* | 4/2010 | Jeddeloh ....................... 711/105 |
| 2011/0058571 | A1 | 3/2011 | Bloch et al. |

OTHER PUBLICATIONS

Fahmy, S., "A Survey of ATM Switching Techniques", Department of Computer and Information Science, The Ohio State University, USA, Aug. 21, 1995 (http://www.cs.purdue.edu/homes/fahmy/cis788.08Q/atmswitch.html).

U.S. Appl. No. 12/876,265 Office Action dated May 1, 2013.

Ravid et al., U.S. Appl. No. 13/802,926, filed Mar. 14, 2013.

* cited by examiner

NETWORK ELEMENT WITH SHARED BUFFERS

FIELD OF THE INVENTION

The present invention relates generally to data networks, and particularly to network elements having shared buffers.

BACKGROUND OF THE INVENTION

Network switches and other network elements often buffer incoming data packets in memory before forwarding the packets to their destinations. Some switch configurations use shared memory. For example, U.S. Patent Application Publication 2006/0155938, whose disclosure is incorporated herein by reference, describes a shared memory having a plurality of receive ports and a plurality of transmit ports characterized by a first data rate. The memory includes a plurality of memory banks organized in rows and columns, and operation of the memory array is characterized by a second data rate. Buffering is operable to decouple operation of the receive and transmit ports at the first data rate from operation of the memory array at the second data rate.

U.S. Patent Application Publication 2011/0058571, whose disclosure is incorporated herein by reference, describes a communication apparatus that includes a plurality of switch ports. Each switch port includes one or more port buffers for buffering data that traverses the switch port. A switch fabric is coupled to transfer the data between the switch ports. A switch control unit is configured to reassign at least one port buffer of a given switch port to buffer a part of the data that does not enter or exit the apparatus via the given switch port, and to cause the switch fabric to forward the part of the data to a destination switch port via the at least one reassigned port buffer.

SUMMARY OF THE INVENTION

An embodiment of the present invention that is described herein provides a method for communication in a network element that includes multiple ports. The method includes buffering data packets entering the network element via the ports in input buffers that are respectively associated with the ports. Storage of the data packets is shared among the input buffers by evaluating a condition related to the ports, and, when the condition is met, moving at least one data packet from a first input buffer of a first port to a second input buffer of a second port, different from the first port. Respective output ports, via which the buffered data packets are to exit the network element, are selected from among the ports. The buffered data packets are forwarded to the selected output ports.

In some embodiments, selecting the output ports includes adding to output queues that are respectively associated with the output ports entries, which indicate locations of the data packets in the input buffers, and moving the data packet includes updating an entry of the data packet to indicate the location of the data packet in the second input buffer. Moving the data packet may include buffering the data packet in the second input buffer even though the data packet entered the network element at the first port that is associated with the first input buffer.

In some embodiments, evaluating the condition includes assessing a fill status of at least some of the input buffers. In an embodiment, assessing the fill status includes identifying an imbalance in the fill status of the at least some of the input buffers, and moving the data packet includes reducing the imbalance. In another embodiment, assessing the fill status includes selecting the first input buffer by detecting that the first input buffer is filled above a first threshold, and selecting the second input buffer by detecting that the second input buffer is filled below a second threshold.

In a disclosed embodiment, evaluating the condition includes assessing spare capacities of respective interfaces that connect to at least some of the input buffers. Assessing the spare capacities may include identifying a subset of the input buffers whose respective interfaces have the spare capacities, and selecting the first and second input buffers from the subset.

In another embodiment, selecting the output ports and forwarding the buffered data packets to the output ports include executing a data-path process, and sharing the storage of the data packets among the input buffers includes executing a control-path process independently of the data-path process. In an embodiment, executing the data-path and control-path processes includes operating first and second packet switches independently of one another, such that the first packet switch selects the output ports and forwards the buffered data packets to the output ports, and the second packet switch shares the storage of the data packets among the input buffers. In some embodiments, the method includes adaptively assigning a first packet switch to select the output ports and forward the buffered data packets to the output ports, and a second packet switch to share the storage of the data packets among the input buffers.

There is additionally provided, in accordance with an embodiment of the present invention, a network element including multiple ports and circuitry. The ports include respective input buffers, which are configured to buffer data packets entering the network element at the respective ports. The circuitry is configured to share storage of the data packets among the input buffers by evaluating a condition related to the ports and, when the condition is met, moving at least one data packet from a first input buffer of a first port to a second input buffer of a second port, different from the first port, wherein the circuitry is further configured to select from among the ports respective output ports via which the buffered data packets are to exit the network element, and to forward the buffered data packets to the selected output ports.

The present invention will be more fully understood from the following detailed description of the embodiments thereof, taken together with the drawings in which:

DETAILED DESCRIPTION OF EMBODIMENTS

Overview

Figure 1:
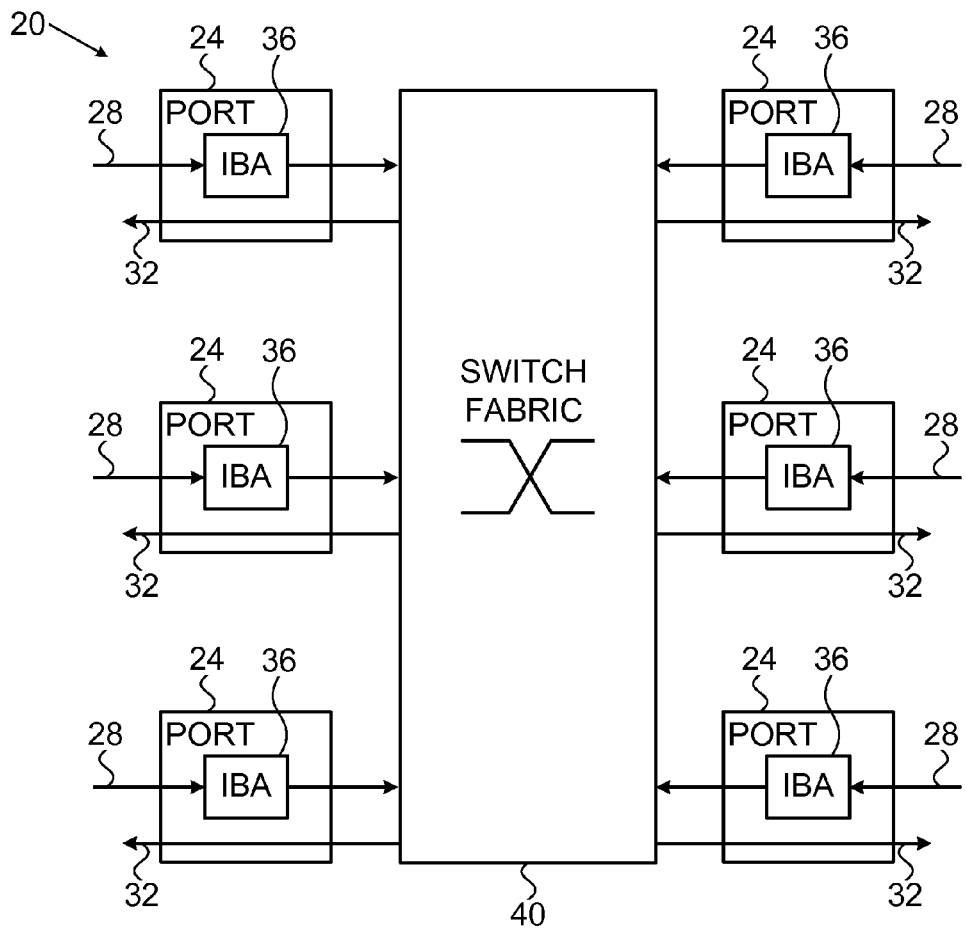
FIG. 1 is a block diagram that schematically illustrates a network switch, in accordance with an embodiment of the present invention.

Embodiments of the present invention that are described herein provide improved methods and systems for buffering data packets in network switches and other network elements. These methods and systems move data packets between input buffers, thereby controlling the load and utilization of the input buffers and their interfaces.

In some embodiments, a network element comprises multiple ports that are coupled to respective input buffers. Each input buffer is configured to buffer data packets that enter the network element at its respective port. The network element selects a respective output port from among the ports for each data packet, and forwards the data packet to the selected output port.

Typically, the network element maintains multiple output queues that are respectively associated with the output ports. Upon selecting a certain output port for a given data packet, the network element adds a corresponding entry to the output queue of the selected output port. The entry points to the location of the given data packet in the input buffers. The data packets are then forwarded from the input buffers to the output ports according to the entries of the output queues.

In many practical scenarios, input buffers of different ports may fill at different rates. At a given point in time, some input buffers may approach overflow while other input buffers may be under-utilized. The methods and systems described herein enable the network element to move data packets from one input buffer to another, and thus balance their utilization. As a result, the overall throughput and efficiency of the network element is improved.

In some embodiments, the network element evaluates a condition related to the ports and, when the condition is met, moves data packets from one input buffer to another. When moving a given data packet, the network element updates the entry of that data packet in the output queues, such that the entry reflects the new data packet location in the input buffers. The network element typically uses this mechanism to balance the load between input buffers, i.e., move data packets from relatively full to relatively empty input buffers. Consequently, a given input buffer may hold data packets that entered the network element at various ports.

In some embodiments, the condition evaluated by the network element considers both the status of the input buffers and the utilization of bus interfaces that connect to the input buffers. For example, the network element may choose to move data packets only between input buffers whose interfaces have spare capacity.

Typically, the disclosed techniques do not modify the order of entries in the output queues when moving data packets between input buffers. Only the addresses specified in the entries are updated to indicate the up-to-date locations of the data packets in the input buffers. This control-path process is typically performed in parallel to the data-path process of selecting output ports and forwarding the data packets. The data-path process is typically unaware of the control-path process, and no additional resources are required in order to implement buffer sharing. When using this technique, the multiple input buffers can be regarded as a single shared resource that can be allocated as needed. Any desired allocation policy can be defined over this shared resource.

System Description

FIG. 1 is a block diagram that schematically illustrates a network switch 20, in accordance with an embodiment of the present invention. Switch 20 may comprise, for example, an Ethernet or Infiniband switch, or it may operate in accordance with any other suitable communication standard or protocol. Switch 20 comprises multiple ports 24 for exchanging data packets with a communication network (not shown). Each port 24 comprises an input port 28 for receiving data packets from the network, and an output port 32 for sending data packets to the network.

Each port 24 is coupled to a respective Input Buffer Array (IBA) 36, which buffers data packets that enter switch 20 via the respective input port 28. IBAs 36 are referred to herein as input buffers, for the sake of clarity. Switch 20 further comprises a switch fabric (SF) 40, which switches data packets between ports 24. Typically, fabric 40 is configured to select a respective output port for each data packet that is buffered in input buffers 36, and to forward each data packet to the selected output port. In some embodiments, switch fabric 40 moves data packets from one input buffer to another, using techniques that are described in detail below.

The configurations of switch 20 and fabric 40 shown in this patent application are example configurations, which are chosen purely for the sake of conceptual clarity. In alternative embodiments, any other suitable switch and fabric configurations can be used. Certain elements of switch 20, such as fabric 40, may be implemented using hardware, such as using one or more Application-Specific Integrated Circuits (ASICs) or Field-Programmable Gate Arrays (FPGAs). Alternatively, some switch elements may be implemented in software or using a combination of hardware and software elements. Generally, the functions of fabric 40 may be performed by any suitable circuitry that connects to ports 24 and carries out the methods described herein.

In some embodiments, certain switch elements are implemented using software that is executed on a programmable processor. The processor may comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Efficient Packet Switching Using Shared Input Buffers

Figure 2:
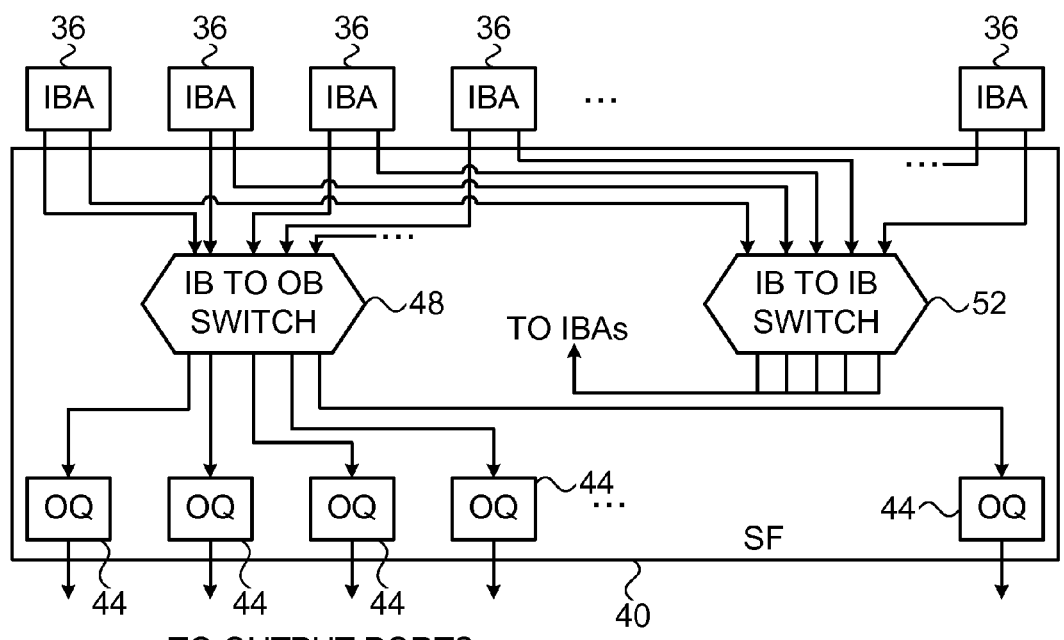
FIG. 2 is a block diagram that schematically illustrates a switch fabric in a network switch, in accordance with an embodiment of the present invention.

FIG. 2 is a block diagram that schematically illustrates switch fabric 40 of network switch 20, in accordance with an embodiment of the present invention. In the present example, fabric 40 comprises multiple Output Queues (OQ) 44. Each output queue 44 is associated with a respective output port 32. OQs 44 typically comprise First-In-First-Out (FIFO) memories, whereas input buffers 36 typically comprise Random Access Memory (RAM). Fabric 40 further comprises an Input-Buffer to Output-Buffer (IB-OB) switch 48, which forwards data packets from input ports 28 to output ports 32.

In a typical flow, data packets enter switch 20 over input ports 28 and are buffered in input buffers 36. IB-OB switch 48 in fabric 40 selects a respective output port 32 for each data packet that is buffered in the input buffers. The selection of output port is typically based on packet header attributes of the data packets.

Once an output port is selected for a given data packet, IB-OB switch 48 adds a corresponding entry to the output queue 44 of the selected output port. The entry, typically a pointer, indicates the location in input buffers 36 where the data packet is held. For example, the entry may specify a port number and an address within the input buffer of that port. The data packets are then served from output queues 44 to the respective output ports 32.

In the present example the data packets remain buffered in the input buffers throughout the switching process. Switch 48 forwards a given data packet to the selected output port by querying the entry of that packet in OQ 44, retrieving the packet from the input buffer location specified in the entry, and sending the retrieved packet to the output port.

In many practical scenarios, the load or utilization of input buffers 36 is not balanced. At a certain point in time, some input buffers may be full or nearly full, while other input buffers may be relatively empty. Such differences may be caused, for example, by different packet arrival rates at different input ports, or for any other reason. In some embodiments, fabric 40 identifies situations of this sort and moves data packets from one input buffer to another in order to balance the load among the input buffers and avoid overflow. In some embodiments, ports 24 use a backpressure mechanism that stops accepting data packets from the network over a given port when the input buffer of that port is about to overflow. The techniques described herein reduce the probability of backpressure, and therefore improve switch performance.

In some embodiments, moving of data packets between input buffers is carried out by an Input-Buffer to Input-Buffer (IB-IB) switch 52 in fabric 40. IB-IB switch 52 operates in parallel to IB-OB switch 48. The operation of the IB-OB switch is referred to herein as a data-path process, whereas the operation of the IB-IB switch is referred to as a control-path process. The two processes may operate concurrently and independently of one another.

In a typical flow, IB-IB switch 52 evaluates a certain condition related to ports 24, which indicates that data packets should be moved. When the condition is met, IB-IB switch 52 moves one or more data packets from one input buffer 36 to another. Several example conditions are described below.

When moving a certain data packet, IB-IB switch 52 updates the entry of that packet in OQ 44. Typically, switch 52 does not modify the output port selection, does not add or delete OQ entries and does not modify the order of entries in the OQs. When moving a data packet between input buffers, IB-IB switch 52 updates the location (e.g., pointer) in the OQ entry that specifies where the data packet is held in the input buffers. In other words, when moving a data packet from address X in input buffer A to address Y in input buffer B, switch 52 updates the entry of the data packet in OQ 44 to indicate address Y in input buffer B.

Thus, when IB-OB switch 48 comes to forward the data packet to the selected output port, the IB-OB switch is able to retrieve the data packet from its new location, even though it was moved by the IB-IB switch to a different input buffer.

IB-IB switch 52 may evaluate various conditions in order to decide whether data packets are to be moved, and between which input buffers. The condition typically depends on the fill status of the input buffers, e.g., on which input buffers are filled to above a certain threshold and/or which input buffers are filled to below a certain threshold. In some embodiments, the condition depends on the utilization status of the interfaces (typically bus interfaces) that connect input buffers 36 to fabric 40. For example, the condition may identify interfaces that have spare capacity and can therefore be used for moving data packets between input buffers.

In one example embodiment, IB-IB switch 52 identifies a subset of one or more input buffers whose interfaces have spare capacity. The IB-IB switch may identify, for example, the X least-utilized interfaces, or the interfaces whose actual utilized throughput is below X% of their capacity. The input buffers in this subset are regarded as potential candidates for moving packets, since their interfaces are capable of handling additional traffic.

Within this subset, IB-IB switch 52 identifies one or more source input buffers from which packets should be moved, and one or more destination input buffers to which packets should be moved. For example, switch 52 may identify in the subset one or more input buffers that are filled to above a certain threshold, and one or more input buffers that have more than a certain spare capacity. Switch 52 then moves data packets from the source input buffers to the destination input buffers. Since the subset was chosen in the first place to include only input buffers whose interfaces have spare capacity, the process of moving data packets between the input buffers has little or no effect on the overall performance of switch 20.

Alternatively, IB-IB switch 52 may decide to move data packets between input buffers, and select input buffers for moving packets, based on any other suitable condition.

In the above-described embodiment, IB-OB switch 48 is statically assigned to carry out the data-path process (i.e., select respective output ports for the incoming data packets and forward the packets to their selected output ports), and IB-IB switch 52 is statically assigned to carry out the control-path process (i.e., move data packets between input buffers). In alternative embodiments, switch 20 may adaptively assign a given packet switch in SF 40 to serve as IB-OB switch 48, and another packet switch to serve as IB-IB switch 52. switch may modify this assignment at any desired time and based on any suitable condition.

Figure 3:
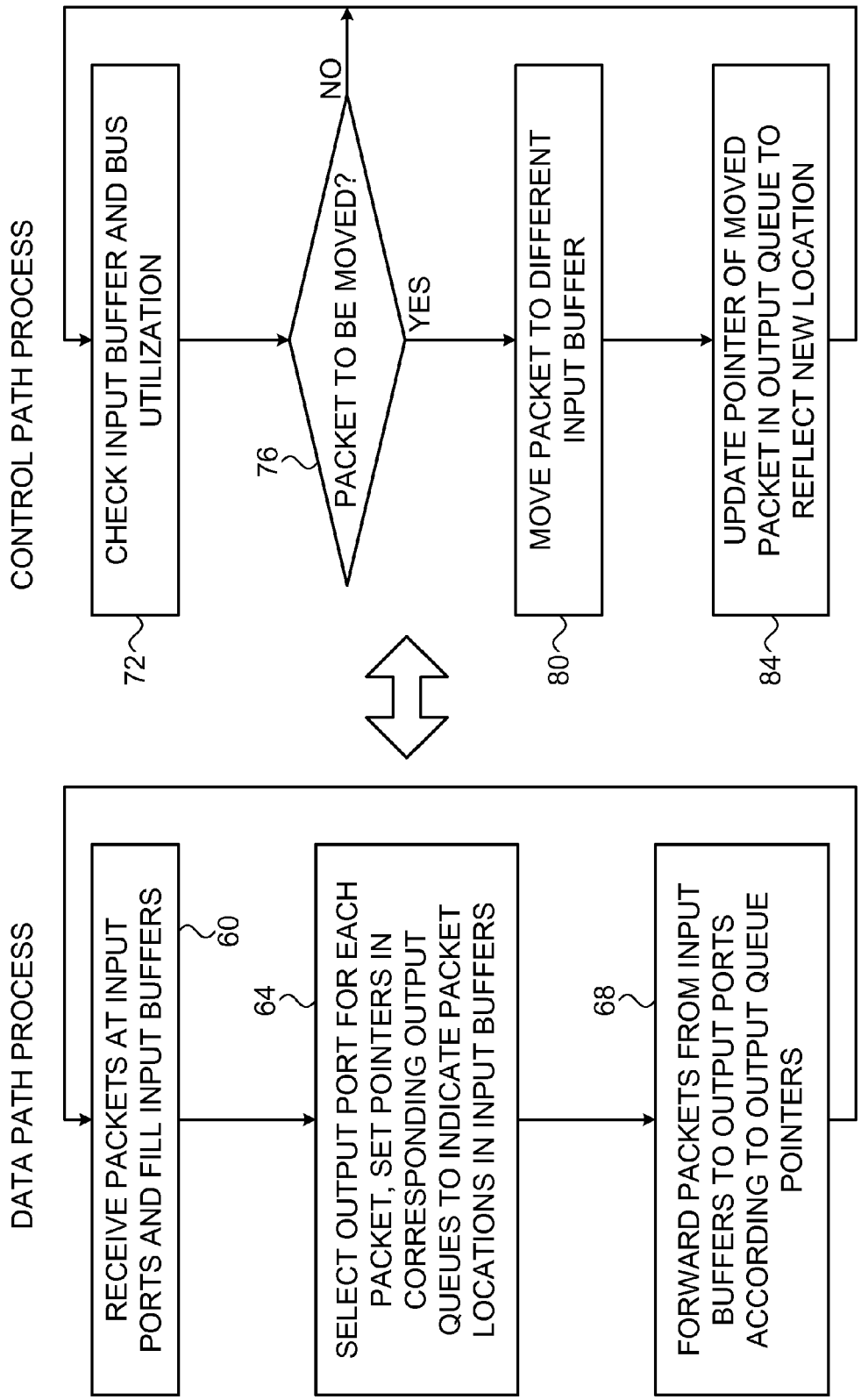
FIG. 3 is a flow chart that schematically illustrates a method for packet switching, in accordance with an embodiment of the present invention.

FIG. 3 is a flow chart that schematically illustrates a method for packet switching, in accordance with an embodiment of the present invention. The figure illustrates a data-path process and a control-path process, which are managed by IB-OB switch 48 and IB-IB switch 52, respectively. The two processes are typically performed concurrently and independently of one another.

The data path process begins with switch 20 receiving data packets at input ports 28, at an input step 60. The incoming packets are buffered in input buffers 36. For each buffered packet, IB-OB switch 48 selects a respective output port 32, at an output selection step 64. For each packet, the IB-OB switch adds an entry in the OQ 44 of the selected output port. The entry points to the location in the input buffer where the packet can be found.

IB-OB switch 48 forwards the data packets from the input buffers to the designated output ports, at a forwarding step 68. The forwarding is performed in accordance with the entries of the data packets in the various output queues. The process loops back to input step 60 in which switch 20 continues to receive and forward data packets.

The control-path process begins with IB-IB switch 52 checking the utilization of input buffers 36 and their bus interfaces, at a utilization checking step 72. Based on the buffer and/or bus utilizations, the IB-IB switch evaluates whether packets are to be moved between input buffers, at a condition evaluation step 76. Any suitable condition, such as the example conditions described above, can be used.

If the condition is not met, i.e., if no packets are to be moved, the process loops back to step 72 above. This situation occurs, for example, when none of the input buffers is over-utilized. Otherwise, the IB-IB switch moves at least one packet between input buffers, at a packet moving step 80. The IB-IB switch updates the output queue entry of the moved packet, such that the entry points to the updated location of the packet in the input buffers. The process then loops back to step 72 above.

Although the embodiments described herein mainly address network switches, the methods and systems described herein can also be used in other network elements, such as in bridges, routers, channel adapters and Network Interface Cards (NIC).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication in a network element that includes multiple ports, the method comprising:
    buffering data packets entering the network element via the ports in input buffers that are respectively associated with the ports;
    sharing storage of the data packets among the input buffers by:
        evaluating a condition related to the ports; and,
        when the condition is met, moving at least one data packet from a first input buffer of a first port, via which the at least one data packet entered the network element, to a second input buffer of a second port, which is different from the first port and via which the at least one data packet did not enter the network element;
    selecting from among the ports respective output ports via which the buffered data packets are to exit the network element; and
    forwarding the buffered data packets to the selected output ports.

2. The method according to claim 1, wherein selecting the output ports comprises adding to output queues that are respectively associated with the output ports entries, which indicate locations of the data packets in the input buffers, and wherein moving the data packet comprises updating an entry of the data packet to indicate the location of the data packet in the second input buffer.

3. The method according to claim 1, wherein evaluating the condition comprises assessing a fill status of at least some of the input buffers.

4. The method according to claim 3, wherein assessing the fill status comprises identifying an imbalance in the fill status of the at least some of the input buffers, and wherein moving the data packet comprises reducing the imbalance.

5. The method according to claim 3, wherein assessing the fill status comprises selecting the first input buffer by detecting that the first input buffer is filled above a first threshold, and selecting the second input buffer by detecting that the second input buffer is filled below a second threshold.

6. The method according to claim 1, wherein evaluating the condition comprises assessing spare capacities of respective interfaces that connect to at least some of the input buffers.

7. The method according to claim 6, wherein assessing the spare capacities comprises identifying a subset of the input buffers whose respective interfaces have the spare capacities, and selecting the first and second input buffers from the subset.

8. The method according to claim 1, wherein selecting the output ports and forwarding the buffered data packets to the output ports comprise executing a data-path process, and wherein sharing the storage of the data packets among the input buffers comprises executing a control-path process independently of the data-path process.

9. The method according to claim 8, wherein executing the data-path and control-path processes comprises operating first and second packet switches independently of one another, such that the first packet switch selects the output ports and forwards the buffered data packets to the output ports, and the second packet switch shares the storage of the data packets among the input buffers.

10. The method according to claim 1, and comprising adaptively assigning a first packet switch to select the output ports and forward the buffered data packets to the output ports, and a second packet switch to share the storage of the data packets among the input buffers.

11. A network element, comprising:
    multiple ports comprising respective input buffers, which are configured to buffer data packets entering the network element at the respective ports; and
    circuitry, which is configured to share storage of the data packets among the input buffers by evaluating a condition related to the ports and, when the condition is met, moving at least one data packet from a first input buffer of a first port, via which the at least one data packet entered the network element, to a second input buffer of a second port, which is different from the first port and via which the at least one data packet did not enter the network element, wherein the circuitry is further configured to select from among the ports respective output ports via which the buffered data packets are to exit the network element, and to forward the buffered data packets to the selected output ports.

12. The network element according to claim 11, wherein, upon selecting the output ports, the circuitry is configured to add to output queues that are respectively associated with the output ports entries, which indicate locations of the data packets in the input buffers, and wherein, upon moving the data packet, the circuitry is configured to update an entry of the data packet to indicate the location of the data packet in the second input buffer.

13. The network element according to claim 11, wherein the circuitry is configured to evaluate the condition by assessing a fill status of at least some of the input buffers.

14. The network element according to claim 13, wherein the circuitry is configured to identify an imbalance in the fill status of the at least some of the input buffers, and to reduce the imbalance by moving the data packet.

15. The network element according to claim 13, wherein the circuitry is configured to select the first input buffer by detecting that the first input buffer is filled above a first threshold, and to select the second input buffer by detecting that the second input buffer is filled below a second threshold.

16. The network element according to claim 11, wherein the circuitry is configured to evaluate the condition by assessing spare capacities of respective interfaces that connect to at least some of the input buffers.

17. The network element according to claim 16, wherein the circuitry is configured to identify a subset of the input buffers whose respective interfaces have the spare capacities, and to select the first and second input buffers from the subset.

18. The network element according to claim 11, wherein the circuitry is configured to select the output ports and forward the buffered data packets to the output ports by executing a data-path process, and to share the storage of the data packets among the input buffers by executing a control-path process independently of the data-path process.

19. The network element according to claim 11, wherein the circuitry comprises first and second packet switches that operate independently of one another, wherein the first packet switch is configured to select the output ports and forward the buffered data packets to the output ports, and wherein the second packet switch is configured to share the storage of the data packets among the input buffers.

20. The network element according to claim 11, wherein the circuitry is configured to adaptively assign a first packet switch to select the output ports and forward the buffered data packets to the output ports, and a second packet switch to share the storage of the data packets among the input buffers.

* * * * *